United States Patent Office 3,763,057
Patented Oct. 2, 1973

3,763,057
FLAME RESISTANT ISOCYANURATE FOAMS CONTAINING RED PHOSPHOROUS
Hans Joachim Diehr, Leverkusen, Germany, assignor to Bayer Aktiengesellschaft, Leverkusen, Germany
No Drawing. Filed Oct. 19, 1971, Ser. No. 190,675
Claims priority, application Germany, Oct. 20, 1970, P 20 51 304.6
Int. Cl. C08g 22/44, 33/02, 51/56
U.S. Cl. 260—2.5 AW        7 Claims

ABSTRACT OF THE DISCLOSURE

Foam resins which contain isocyanurate groups are provided as well as a process for preparing them by polymerizing polyisocyanates in the presence of isocyanate polymerizing catalysts and blowing agents, optionally in the presence of stabilizers, auxiliary agents and less than equivalent quantities of compounds which contain active hydrogen atoms, characterized in that polymerization is carried out with the addition of red phosphorus.

---

Foam resins which contain isocyanurate groups can be produced by known processes from polyisocyanates using basic catalysts, optionally in the presence of blowing agents, subequivalent amounts of compounds which contain active hydrogen atoms, stabilizers and other additives. Polyisocyanurate foam resins obtained by such processes are characterized by their high temperature resistance and high flame resistance. When the foam resin is exposed to flame a coherent layer of carbon is formed which protects the foam resin underneath it against further attack by the flame. It has previously been a disadvantage of these foam resins that the flames spread very rapidly over the surface of the foam.

It is therefore an object of this invention to provide polyisocyanurate foams and a process for preparing them which are devoid of the foregoing disadvantages.

Another object of this invention is to provide polyisocyanurate foams having high temperature and flame resistance, the destruction of the surface of which is reduced upon exposure to flame.

Still another object of this invention is to provide polyisocyanurate foams which have surfaces resistant to the ravages of flame and which can be prepared without the addition of traditional flame retarding agents.

A further object of this invention is to provide a method of providing the flame resistant polyisocyanurate containing foams of this invention using an expedient that is both safe and easy to handle.

The foregoing objects and others which will become apparent from the following discussion are accomplished in accordance with this invention, generally speaking, by providing fire resistant polyisocyanurate foams which are prepared by polymerizing organic polyisocyanates in the presence of an isocyanate polymerization catalyst and a blowing agent, optionally in the presence of stabilizers, other auxiliary agents and less than equivalent quantities of compounds which contain hydrogen atoms, reactive with NCO groups, characterized in that polymerization is carried out with the addition of an effective amount of red phosphorus. Surprisingly, the destruction of the surface of the foam by fire can be reduced by the addition of red phosphorus to the foam mixture without the addition of any other flame retarding agent. Foam resins produced by this process can be classified as "difficultly inflammable" synthetic resins in accordance with DIN 4102.

The quantity of red phosphorus added to the foaming mixture is so calculated that it amounts to between 0.5 and 20% by weight, preferably between 1 and 7% by weight, based on the total weight of foamable mixture.

Red phosphorus, which is easy and safe to handle, may either be added in the form of a finely ground powder to the foaming mixture or made up into a suspension or paste with one of the foaming components which is then added to the reaction mixture in the required quantity before foaming. The latter method has the advantage that when the foam resins are produced in foaming apparatuses which are equipped with pumps, the red phosphorus can be added in reproducible quantities.

Any organic polyisocyanate can be used in the practice of this invention including aliphatic and aromatic polyisocyanates, preferably aromatic polyvalent isocyanates. Some such suitable organic polyisocyanates include alkylene diisocyanates such as tetramethylene diisocyanates, hexamethylene diisocyanates and the like; arylene diisocyanates and their alkylation products such as phenylene diisocyanates, naphthylene diisocyanates, diphenylmethane diisocyanates, tolylene diisocyanates, di- and tri-isopropylbenzene diisocyanates, triphenylmethane triisocyanates, triesters of p-isocyanatophenylthiophosphoric acid, triesters of p-isocyanatophenylphosphoric acid and the like; arylkyldiisocyanates such as 1 - (isocyanatophenyl)-ethylisocyanate, xylylene diisocyanates and the like, polyisocyanates which may contain various substituents such as alkoxy groups, nitro groups, chlorine or bromine or polyisocyanates which are modified with subequivalent quantities of polyhydroxyl compounds such as trimethylolpropane, hexane triol, glycerol or butanediol and the like. The polyisocyanates disclosed in U.S. Pat. 3,350,362 as well as those prepared as described in Belgian Pat. 714,850 may also be used in the practice of this invention. A preferred polyisocyanate is polyphenyl-polymethylene polyisocyanate which may be prepared by aniline-formaldehyde condensation followed by phosgenation as described, for example, in U.S. Pat. 2,683,730. Other suitable polyisocyanates include, for example, polyisocyanates which are masked with phenols, oximes or bisulphite, acetal modified polyisocyanates and polymerized polyisocyanates which have isocyanurate rings as well as higher molecular weight polyisocyanates which may be prepared by reacting an excess of a monomeric polyisocyanate with low molecular weight and/or higher molecular weight compounds which contain hydrogen atoms reactive with NCO groups as described below, preferably low molecular weight and/or higher molecular weight polyhydroxyl compounds. Mixtures of these and other different isocyanates may also be used, in which case monoisocyanates such as phenyl isocyanate, naphthyl isocyanate or any of those disclosed in U.S. Pat. 3,350,362 may also be added at a concentration of up to about 50 mol percent.

The polymerization reaction of the isocyanate compound may be carried out in the presence of less than equivalent quantities of compounds which contain hydrogen atoms reactive with NCO groups. The active hydrogen containing compound is preferably water, in which case an additional blowing effect is achieved. Otherwise, any of the compounds generally used in polyisocyanate polyaddition reactions can be used such as organic compounds which have several active hydrogen atoms and a molecular weight of from about 32 to about 10,000, preferably from about 500 to about 5000. These compounds may be used either singly or as mixtures and apart from polyamines and amino alcohols, the compounds advantageously chosen are low molecular weight or higher molecular weight hydroxyl compounds of the type already widely used for the production of polyurethane resins as well as the usual monoalcohols and polyalcohols such as butanol, cyclohexanol, benzyl alcohol, ethylene glycol, propylene glycol, glycerol, trimethylolpropane, their addition products with alkylene oxides such as ethylene and/or propylene oxide and the like. The polyfunctional starting components may also be condensation products of the above polyalcohols with polycarboxylic acids such as adipic, sebacic, maleic, phthalic or terephthalic acid. Numerous compounds of this type have been described in "Polyurethanes, Chemistry and Technology," vols. I and II, Saunders-Frisch, Interscience Publishers, 1962 and 1964, in Kunststoffhandbuch, vol. VII, Vieweg-Hochtlen, Carl-Hauser-Verlag, Munich, 1966 and include any of the compounds containing hydrogen atoms reactive with NCO groups disclosed in U.S. Pat. 3,201,372.

The blowing reaction for producing the foam products may be effected via reaction of NCO groups with water or by the use of other blowing agents. The blowing agents may be compounds which decompose to liberate gases such as nitrogen, e.g. azo compounds or sulphonylazides, or low boiling hydrocarbons and their halogenation products, e.g. halogenated methanes or ethanes, ethylene dichloride or vinylidene chloride or any blowing agents disclosed in U.S. Re. 24,514 or U.S. Pat. 3,201,372 and the like. The usual emulsifiers and foam stabilizers may be used as additives to facilitate the foaming reaction, e.g. higher alkyl or aryl sulphonic acids and their salts, sulphuric acid esters of castor oil or ricinoleic acid and their salts, oleic acid salts or stearic acid salts, silicone oils which contain basic groups or mixed condensation products which contain siloxane and alkylene oxide groups or any of the emulsifiers and stabilizers disclosed in U.S. Pat. 3,201,372.

The catalysts used for the polymerization reactions may be compounds which will initiate polymerization of the NCO group at room temperature. Such compounds have been described e.g. in French Pat. 1,441,565 and in Belgian Pats. 723,153 and 723,152. The usual catalysts of isocyanate chemistry may also be added, e.g. those disclosed in U.S. Pats. 2,948,928; 2,941,967; 2,948,691; 3,201,372 and the like including organic metal compounds, inorganic and organic metal salts and tertiary amines such as dimethylbenzylamine.

It is especially advantageous to use mononuclear or multinuclear Mannich bases prepared from condensable phenols which may be substituted with alkyl, aryl or aralkyl radicals, oxo compounds and secondary amines as catalysts, especially those which have been prepared from formaldehyde as the oxo compound and from dimethylamine as the secondary amine.

According to the IR spectroscopic analyses, substantial proportions of carbodiimide structures are generally formed in the foam resins. The proportion of carbodiimide structures varies according to the conditions under which the resins are produced and are especially dependent on the reaction temperature reached. The proportion of carbodiimide can be increased by using catalysts which are known for the production of carbodiimides, especially trivalent to pentavalent organic phosphorus compounds such as phospholines, pholine oxides, tertiary phosphines, (cyclic) esters, amides and esteramides of phosphorus and phosphoric acid. Further details may be found e.g. in "Polyurethanes, Chemistry and Technology," vols. I and II, Saunders-Frisch, Interscience Publishers, 1962 and 1964.

The foam resins are preferably produced mechanically, employing the usual and well known method of mixing the reactants and pouring them into suitable molds. The quantity of the blowing agent used is determined by the unit weight required. In general, between 1 and 100 parts by weight and preferably between 5 and 50 parts by weight of a fluorochloromethane or a corresponding quantity of some other blowing agent, based on the isocyanate component, is used. The unit weights required are generally between 15 and 200 kg./m.$^3$ or more and especially between 20 and 200 kg./m.$^3$.

The compounds with reactive hydrogen atoms which may be used optionally are generally added in such quantities that a sufficient amount of free isocyanate groups will still be available for the polymerization reaction. The quantity is preferably so calculated that at least 50% and preferably more than 70% of the total quantity of isocyanate groups put into the reaction will be available for the polymerization reaction. It is preferred to add such compounds with reactive hydrogen atoms.

The quantity of catalyst is largely determined by the nature (and if indicated the basicity) of the catalyst. It may be between 0.5 and 100% by weight and is preferably between 1 and 25% by weight, based on the weight of the isocyanate component.

Infra-red spectroscopic investigation of the foam resins obtained in the practice of this invention indicated high proportions of isocyanurate rings in addition to small amounts of carbodiimide groups.

The products of the process of this invention may be used e.g. as soundproofing materials, insulating materials or constructional materials and they may be used in the furniture industry.

The invention is further illustrated but is not intended to be limited by the following examples in which all parts and percentages are by weight unless otherwise specified.

EXAMPLES

Composition of the catalysts used for foaming

A=Mannich base of 2 mols of phenol, 5 mols of formaldehyde and 4 mols of dimethylamine.
B=Mannich base of 2 mols of commercial p-isononylphenol, 2 mols of dimethylamine and 3 mols of formaldehyde.

Example 1

About 9 parts of catalyst B are mixed with about 2 parts of a polysiloxane polyether copolymer, about 15 parts of monofluorotrichloromethane and about 10 parts of a paste which contains about 33% of red phosphorus and about 67% of an addition product of trimethylolpropane and ethylene oxide (OH number 260), and 100 parts of crude diphenylmethane-4,4'-diisocyanate is then added to the mixture. The mixture is vigorously stirred for a few seconds and poured into previously prepared paper molds. A hard foam resin is obtained within less than 3 minutes.

Example 2

A prepolymer which has an NCO content of about 26% is prepared from about 90 parts of crude diphenylmethane-4,4'-diisocyanate and about 10 parts of an addition product of trimethylolpropane and ethylene oxide (OH number 260) at about 60° C. About 15 parts of monofluorotrichloromethane and about 2 parts of finely ground red phosphorus (particle size less than 60μ) are added to this addition product with vigorous stirring and the whole mixture is then introduced into a mixture of about 1 part of catalyst A, about 5 parts of catalyst B and about 2 parts of a polysiloxane polyether copolymer. A tough, hard foam is obtained which has a very regular fine cell structure.

Examples 3 and 4

The procedure described in Example 2 is repeated exactly except that about 3 parts and about 5 parts, respectively, of finely ground red phosphorus are added.

The hard foam resins produced in the preceding examples were tested according to DIN specification 4102 (Egner's fire shaft) and they had an undestroyed residual length of 25 to 45 cm., thus classifying them as "difficulty inflammable" synthetic resins. The physical properties of these foam resins are summarized in the following table.

Comparison example

A hard foam resin was prepared according to the recipe of Example 2, however, without adding red phosphorus.

| Example | Unit weight, kg./m.³ | Compression strength kg. wt./cm.² | Heat bending resistance, °C. | Dimensional stability at, +100° C. | Dimensional stability at, −30° C. | Flammability Test according to DIN 4102 undestroyed residual length in cm. | Thermal conductivity, Kcal./m./h./°C. |
|---|---|---|---|---|---|---|---|
| 1 | 45 | 2.2 | 220 | No swelling | No shrinkage | 26 | |
| 2 | 44 | 2.9 | 190 | do | do | 25 | 0.018 |
| 3 | 39 | 2.2 | 219 | do | do | 30 | 0.018 |
| 4 | 38 | 2.5 | 210 | do | do | 45 | |
| Comparison Ex. | 40 | 2.0 | 210–220 | do | do | 0 | 0.019 |

Infra-red spectroscopic investigations of the foam resins obtained in the examples show that high proportions of isocyanurate groups and small amounts of carbodiimide groups are present.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Flame resistant polyisocyanurate foams prepared by a process which comprises polymerizing organic polyisocyanates in the presence of a blowing agent and an effective amount of red phosphorus to impart flame resistance sufficient to be classified "difficultly inflammable" according to DIN 4102.

2. The polyisocyanurate foam of claim 1 wherein the red phosphorus is present at a concentration of from about 0.5 to about 20% by weight of red phosphorus based on the total weight of the reaction mixture.

3. The polyisocyanurate foam of claim 1 wherein the reaction mixture contains a compound which contains hydrogen atoms reactive with NCO groups.

4. The polyisocyanurate foam of claim 3 wherein the reactive hydrogen containing compound is present at a concentration sufficient to react with up to about 50% of the total quantity of isocyanate groups in the reaction mixture.

5. The polyisocyanurate foam of claim 1 wherein the organic polyisocyanate is polymerized with from about 0.5 to about 100% by weight based on the weight of the organic polyisocyanate of a polymerization catalyst.

6. The polyisocyanurate foam of claim 1 wherein the reaction mixture contains from about 1 to about 100 percent by weight based on the weight of the organic polyisocyanate of a blowing agent.

7. The polyisocyanurate foam of claim 1 wherein the red phosphorus is present at a concentration of from about 1 to about 7% by weight of red phosphorus based on the total weight of the reaction mixture.

References Cited
UNITED STATES PATENTS
3,330,783   7/1967   Piechota   260—2.5 AJ
3,620,987   11/1971   McLaughlin   260—2.5 AW
3,635,848   1/1972   Rambosek   260—2.5 AW

FOREIGN PATENTS
1,155,768   6/1969   Great Britain   260—2.5 AW

DONALD E. CZAJA, Primary Examiner

C. W. IVY, Assistant Examiner

U.S. Cl. X.R.

260—2.5 AJ, 45.7 P